(No Model.)
D. F. MAINE.
CHECK HOOK.
No. 537,840. Patented Apr. 23, 1895.
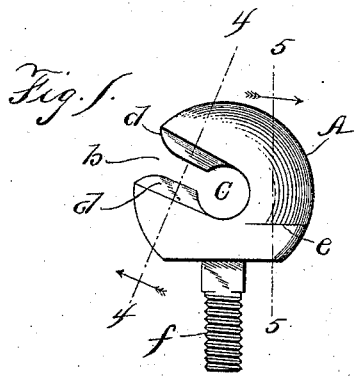
Fig. 1.
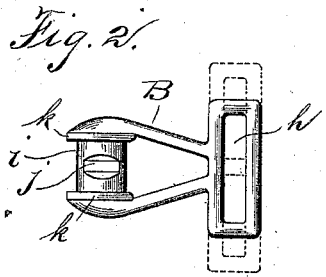
Fig. 2.
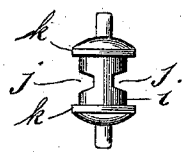
Fig. 3.
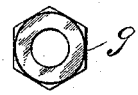
Fig. 6.
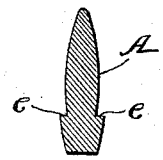
Fig. 4.
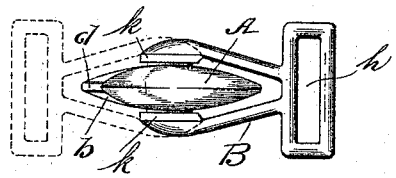
Fig. 5.
Fig. 7.
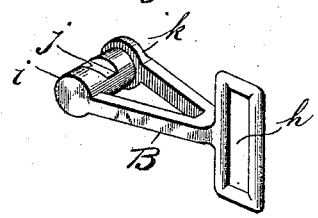
Fig. 8.
Witnesses:
Joseph L. Scott
Hugh S. Scott
Inventor:
David F. Maine

United States Patent Office.

DAVID F. MAINE, OF MANSFIELD, OHIO, ASSIGNOR TO FRED. W. POWERS, OF REINBECK, IOWA.

CHECK-HOOK.

SPECIFICATION forming part of Letters Patent No. 537,840, dated April 23, 1895.

Application filed December 3, 1894. Serial No. 530,727. (No model.)

*To all whom it may concern:*

Be it known that I, DAVID F. MAINE, of Mansfield, in the county of Richland, State of Ohio, have invented a new and useful Rein-Holder, of which the following is a specification.

My object is to detachably connect a bridle rein with a harness saddle in such a manner as to prevent the annoyances incident to the accidental disconnection of the rein from a fastening device fixed to the saddle, and my invention consists of two parts, adapted to be applied and operated, as hereinafter set forth, pointed out in my claims, and illustrated in the accompanying drawings, in which—

Figure 1 is a side view of the part adapted to be fixed to a harness saddle; Fig. 2, a top view, and Fig. 3 an end view, of the part adapted to be detachably connected with the saddle, and a bridle rein. Fig. 4 is a sectional view on the line 4 4 of Fig. 1. Fig. 5 shows the two parts connected as required in practical use. Fig. 6 shows a nut for clamping the one part fast to a saddle tree. Fig. 7 shows a piece of the part separated on line 5 5 of Fig. 1 to show shoulders at the side. Fig. 8 is a perspective view of the part adapted to be connected with a rein and also with a harness saddle and shows the loop and journal in right angled position to each other.

The letter A designates the part adapted to be fixed to a saddle to serve as a check hook. It has a transverse slot $b$ that terminates in a circular central bearing C. On the upper and lower faces of the slotted portion are ribs $d$ that project into the slot and on the outside faces of the device are shoulders $e, e$, adapted for use as hereinafter stated. $f$ is a screw-threaded shank. The slot $b$ extends approximately at right angles to the shank $f$.

B is the part adapted to be connected with a rein to serve as a rein holder. It consists of a loop, $h$, through which a rein can be passed, and an integral journal $i$ provided with grooves at its center and flanges K at its ends. The loop may be double, as indicated by dotted lines in Fig. 2, and thereby adapted to receive a double overdraw check rein.

In the practical use of my invention, the part A is fixed to a harness saddle, by means of its screw-threaded shank and a nut, in such a manner that the slot $b$ will be on the rear side, and the part B is detachably connected with a rein in such a manner that the rein can slide longitudinally within the loop $h$ and the journal $i$ passed in and out of the slot $b$ of the part A as required to detachably connect the rein with the harness saddle. To introduce the journal $i$ into the slot $b$ the part B must be placed in such a position that the journal will enter and slide forward in the slot. To securely retain the journal within the part A the position of the loop $h$ must be reversed so that it will extend forward and this is readily accomplished by turning it upward and forward so that it will rest on the shoulders $e$ of the part A.

To detach the rein holder part B from the fixed check A, a reverse motion of the part B is required.

It is obvious that the journal $i$, having central grooves, cannot escape from the slot $b$ until the part B is extended rearwardly relative to the part A so as to allow the ribs $d$ to enter the grooves in the journal and the journal to traverse the slot $b$ rearwardly. It is also obvious that the transverse grooves in the journal $i$ and the ribs $d$ of the part A may be dispensed with and the two-part rein holder and complete device operated successfully for the purposes contemplated without said grooves and ribs.

A simple, strong and durable coupling is thus provided for detachably connecting a rein with a harness saddle in such a manner that the rein will be securely retained in its place as required for safety in driving and governing a horse.

I claim as my invention—

1. A rein holder consisting of two parts, to wit: a hook-shaped part that has a journal bearing in its center and an open slot extending outward rearwardly and its bottom adapted in form to be fixed to a harness saddle, and a loop adapted to admit a rein and provided with a forward extension and a journal at the end of the extension as shown and described.

2. A reinholder composed of a check hook part A having a slot $b$, a journal bearing $c$ at the inner end of the slot, ribs $d$ on the faces of the slot, and a part B consisting of a loop $h$ having an integral journal $i$, provided with grooves at its center and flanges $k$ at its ends and adapted to traverse the slot $b$, to operate in the journal bearing $c$, in the manner set forth for the purposes stated.

DAVID F. MAINE.

Witnesses:
 JOSEPH Y. SCOTT,
 HUGH S. SCOTT.